July 6, 1954            F. BOCK            2,682,751

APPARATUS FOR THE TRANSPORTATION OF BULK GOODS

Filed June 26, 1950            7 Sheets-Sheet 1

Inventor:
Franz Bock
By:
Cushman, Darby & Cushman
attys.

July 6, 1954   F. BOCK   2,682,751
APPARATUS FOR THE TRANSPORTATION OF BULK GOODS
Filed June 26, 1950   7 Sheets-Sheet 4

Inventor:
Franz Bock
By:
Cushman, Darby & Cushman
Attys.

July 6, 1954 F. BOCK 2,682,751
APPARATUS FOR THE TRANSPORTATION OF BULK GOODS
Filed June 26, 1950 7 Sheets-Sheet 5

Inventor:
Franz Bock
By: Cushman, Darby & Cushman
attys.

Patented July 6, 1954

2,682,751

UNITED STATES PATENT OFFICE 2,682,751

APPARATUS FOR THE TRANSPORTATION OF BULK GOODS

Franz Bock, Koln-Bayenthal, Germany

Application June 26, 1950, Serial No. 170,330

Claims priority, application Germany April 17, 1950

2 Claims. (Cl. 61—67)

The invention relates to apparatus for the improvement of the transportation of preferably bulk goods, i. e. coal, ore, etc. by ship, rail or road.

The invention especially relates to apparatus for the transportation of bulk goods by which the goods remain in the same floatable transport container though the method of the transportation being changed. The object of the invention concerned is apparatus for the transfer of floatable but not navigable transport containers from rail or road to water and vice versa.

In order to explain the cooperation of the apparatus according to the invention, details are shown on the following drawings, in which mean:

Fig. 7 shows the moment of transfer of the container from water to rail, Figs. 8a–c, the longitudinal section of the water-channel for the transfer of the transport container, Fig. 9, cross section of the water channel as per Fig. 8, Figs. 10a–d, the horizontal plan of the water channel as per Fig. 8, Fig. 11, the horizontal plan of a float of floatable transport containers, Fig. 12, longitudinal section of same, Fig. 13, horizontal plan of the wheel house of a float with four rows of containers, Fig. 14, the same for a float with three rows, Fig. 15, a longitudinal section of a seagoing freighter for the transport of floating containers, Fig. 16, a horizontal plan of same, Fig. 17, a cross section of same, Fig. 18, a stern view of same, Figs. 19–26, the act of loading the seagoing freighter, Fig. 27, a longitudinal section of the loading dock, Fig. 28, a horizontal plan of same, Fig. 29, a section of a lifting device for floatable transport containers.

According to my invention the method of transfer of floatable transport containers from rail or road to water and vice versa has the purpose of essentially simplifying and cheapening the rather complicated and expensive methods used up to date. The methods for transfer of floatable transport containers or loads from water to rail or road used up to date operate in such a way that the transport container or loads are lifted from the water by means of cranes, transported laterally and then set down on ready vehicles. Vice versa the transport containers or loads are taken off the vehicles by means of cranes and brought down to water.

This well known method is obviously complicated and expensive. As the transport containers have rather large dimensions and a heavy weight when they are loaded the cranes must also be large and have a much higher capacity than ordinary cranes. Moreover, the method of transfer of floatable transport containers used up to date usually necessitates quite vertical quais in order to bring the floatable transport container near to the crane.

The present invention puts an end to the above mentioned disadvantages of the methods used up to date. According to my invention a vehicle for rail or road transport moving on a downward sloped waterway parallel to the longitudinal axis of the floatable container passes under the floatable container in such a way that when the vehicle moves on the subwaterway in upward direction the container is automatically set upon the under-carriage of this vehicle. In case a floatable transport container is brought from rail or road to water the vehicle loaded with the container—not stiffly tied to the vehicle—will descend on the subwaterway until the buoyancy acting upon the floatable container is great enough to lift the container from the vehicle and to free it for floating. It can be seen that the method according to my invention has the considerable advantage that complicated and expensive cranes are avoided, furthermore, the channel for the transport containers may be built in a considerably inexpensive way with normal slopes adapted to the surface of the ground.

Figure 1:
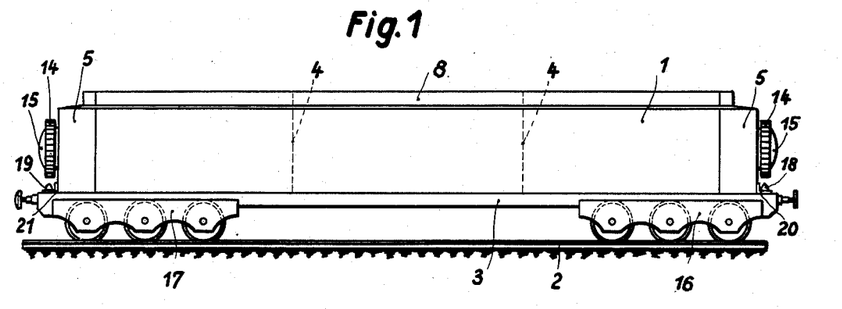
Fig. 1, a side view of the floatable transport container on an under-carriage.
Figure 3:
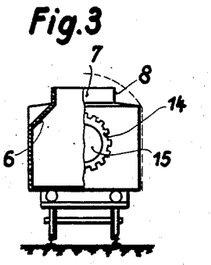
Fig. 3, front end view of the transport container, partly in section.
Figure 4:
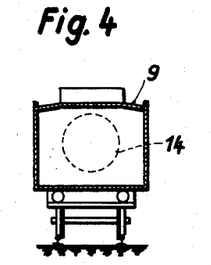
Fig. 4 is a transverse central sectional view of a modified form of the invention showing a removable cover associated with the container.
Figure 5:
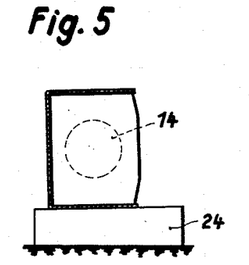
Fig. 5 shows a method of how to load and discharge the floatable transport container on land.

In Fig. 1, the floatable transport container 1 is put on a railway under-carriage 3. The cross section of the container 1, as shown in Figs. 3–5, is nearly rectangular. The transport container is constructed of welded steel plates and reinforced by frames. Its length is subdivided into three portions of rather equal size by two bulkheads 4. The front faces, as shown at 5, are sloped or tapered in order to facilitate the navigation and to avoid troubles during the railway transport.

The transport container constructed as shown in Fig. 3 on the left part, has an inner sloping 6 by which the discharge of the container will be simplified as the goods in the container glide down the sloping 6 to the discharge opening when tilted on its longitudinal axis. The container as shown in Fig. 3 is open all along its upper surface so that the charging can be performed in the usual manner by pouring in. The opening 7 is completely surrounded by a headpiece attachment 8 in order to prevent water splashing into the container when heavily loaded.

Figure 6:
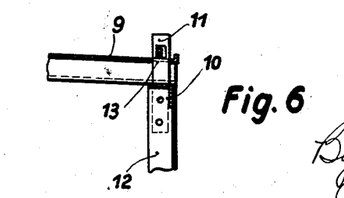
Fig. 6 shows a sectional detail of the container.

In case the container is used for the transport of goods sensitive to water it is of advantage to choose a construction performance as per Fig. 4 in which the upper open surface of the container is shut by a removable cover 9 consisting of several parts and closing tightly. This cover 9 as shown in Fig. 6 to rest on angle irons 10 which are connected to the inner part of the walls of the container. The cover is held in this position by lashes 11 which are screwed to frames 12 and pass through corresponding slots 13 of the cover 9.

For the transport of liquids it is of advantage to provide an entirely closed container fitted with apparatus as generally used for filling and discharging.

In Fig. 5 the possibility of loading and discharging of the transport container is shown when the goods consist of cases, bundles, barrels, etc. which may be transported in any position. For this purpose the transport container will be tilted on a loading dock 24 and can then easily be loaded by piling up. After this the transport container will be re-tilted to its normal position on the under-carriage. The front faces of the container are each fitted with a heavy toothed wheel 14 the center of which lays on the longitudinal gravity axis of the container. The spokes are covered with a protective hood 15 which acts as a buffer when containers are tied together to a float. The purpose of the toothed wheels 14 is to lift the container from the vehicle by means of chains carried by cranes when arrived at the place of final discharge. The discharge is performed by tilting the container on its longitudinal axis.

As shown in Fig. 1 the transport container is put on the undercarriage 3 of the ralroad vehicle fitted with two bogies 16 and 17. The length of the undercarriage is such that the transport container does not exceed the length of the vehicle. As mentioned above the slopings 5 at the corners of the front faces of the transport container are mainly necessary for railroad transport as otherwise there will be a danger for the vehicles on the parallel rails when passing a curve due to the fact that the ends of the transport container extend into the space above the parallel track.

In order to prevent the floatable transport containers being displaced on the railway undercarriage when mounted thereon the undercarriage is fitted on both its ends with tapered pins 18 and 19 which fit into corresponding annulars 20 and 21 fixed to the front faces of the transport container. Owing to this loose connection between the vehicle and the transport container this will be allowed to move only in upward direction.

Figure 2:
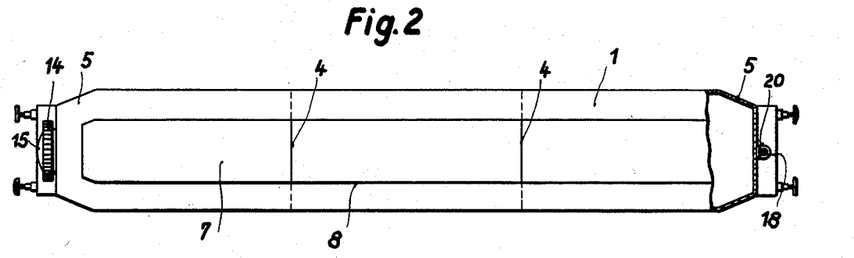
Fig. 2, horizontal plan of same.
Figure 7:
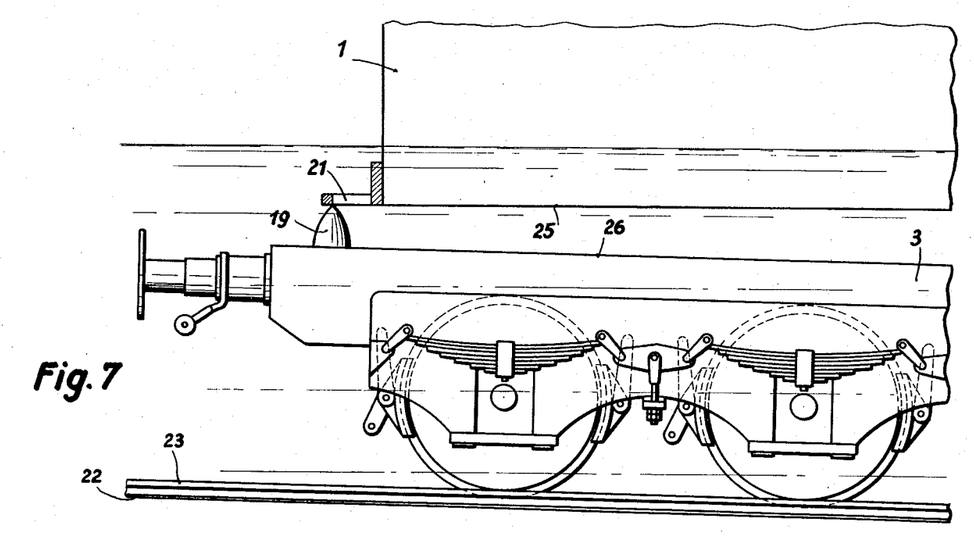

In Fig. 7 the transfer of a floatable container from the water surface to a railroad is shown in its main course. On the ground 22 of a waterway, a track 23 leads into deeper water at a certain small angle. Before the floatable container is pulled into the channel the under-carriage 3 will be run into the water to a depth allowing the floatable container 1 to be pulled over the undercarriage 3. As soon as the undercarriage 3 is drawn back it approaches from underneath the floatable transport container 1 because of the slope of the subwaterway. The undercarriage 3 at first contacts the bottom of the floatable container with the tapered pin 19. Means may be provided to assure proper positioning of longitudinal axis of the vehicle and that of the floatable container, the tapered pin 19, when the carriage further moves toward land, slides in the middle of the lower side of the container until it fits into the eye shaped holder 21 at the end of the container. The mentioned pin 19 which will fit into the holder, at first little, then more, pulls the floatable container into lower water with the speed of the under-carriage 3. At last the vehicle 3 is driven upwards on the subwaterway to such a point that the lower side 25 of the floatable container lays on the upper side 26 of the railroad vehicle, at first at the higher end of the vehicle and later on, as the vehicle moves on at the whole length of the vehicle. At the lower end of the vehicle, not shown on this drawing, a corresponding pin 18 will fit automatically a holder 20 of the floatable container, as can be seen from Fig. 2. After this the vehicle is drawn out of the water on to normal tracks.

Conversely when transferring a transport container from rail to water, the vehicle loaded with a transport container will run down a subwaterway until the buoyancy acting upon the container is strong enough to lift the container from the vehicle and to release it for swimming.

Figures 8A, 8B:
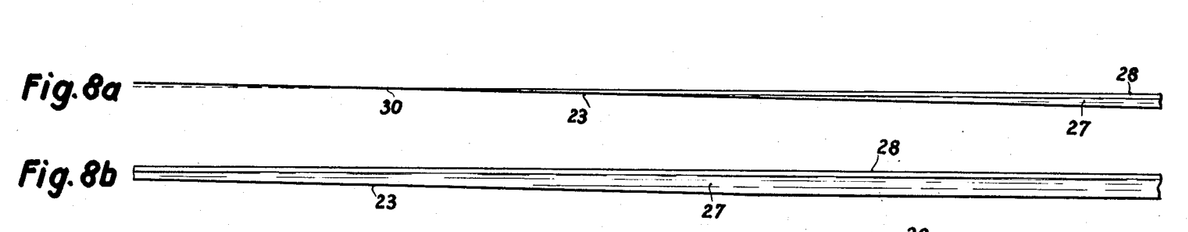
Figure 8C:
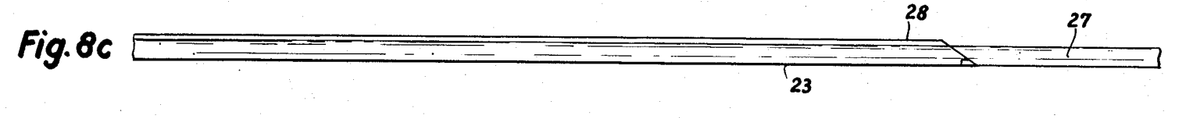
Figure 9:
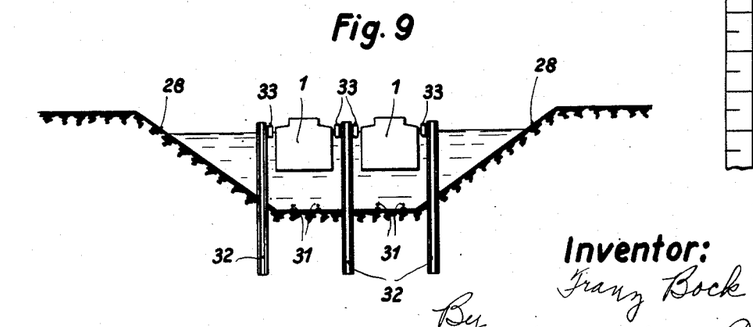
Figure 10A:
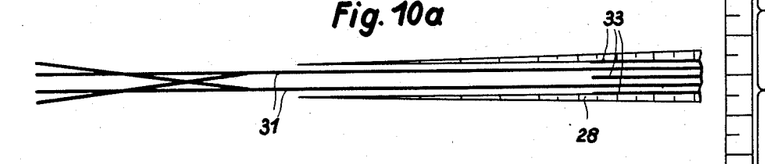
Figure 10B:
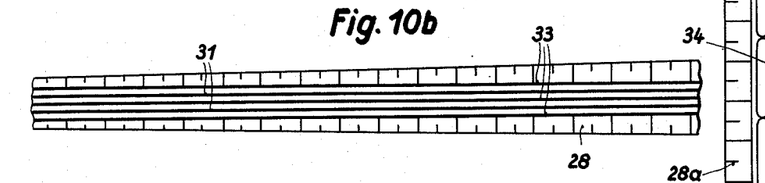
Figure 10C:
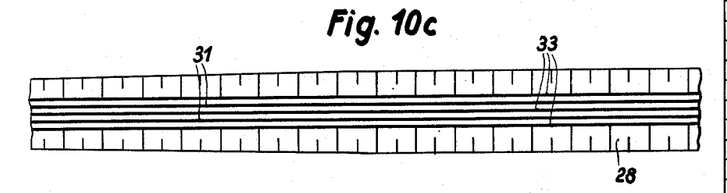
Figure 10D:
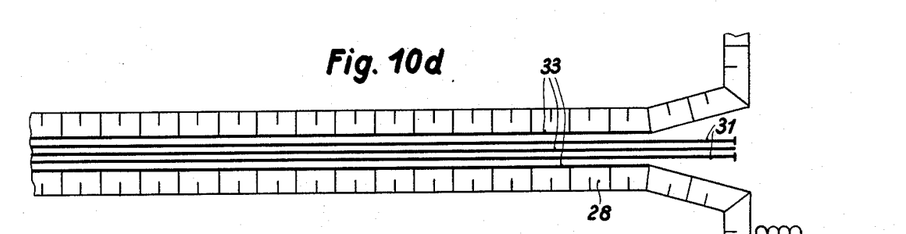

Fig. 8a shows a longitudinal section of the water channel as it is used for the performance of the method of transferring according to my invention. The water 27 fills the channel to a certain level, said channel being bound by slopes 28, and the bottom of the channel with the rails 23 ascends slowly until it reaches the water level at point 30. Fig. 9 shows the rails 31 on the ground of the water channel. The transport containers 1 are floatable just above the rails and are kept in the shown direction by special guides. These guides consist of several iron posts 32 rammed into the ground in equal distance, the posts being connected by wooden bars 33 at the water level. The floatable transport containers are conducted between the wooden bars with little play. The channel has no vertical quais but normal slopes 28 which eventually are adapted to the ground.

The distance between the bottom of the floatable container and the track depends on the water level and on the draught of the floatable container. It is clear that the vehicle running down the subwaterway will move farther into the channel the heavier the floatable container is loaded and the lower the water level is.

The horizontal plan of the transferring equipment as per Figs. 10a–d, shows once more the track 31, the guides 33 and the slopes 28. Along part 28a of the slope a float 34 composed of a series of floatable transport containers can be seen, the different transport containers of which have to be transferred to the railroad without cranes being used. As the float is combined of thirty-six floatable transport containers it is advisable to arrange eighteen vehicles coupled together on each of the two subwater tracks and then to pull eighteen floatable containers into the space between the guides 33. The transfer of the floatable containers to the different vehicles is performed in the way described above on the condition that the distance between one vehicle and the next and one container and the following is equal, so that the tapered pins 18 and 19 of the vehicles are able to fit the corresponding holders of the transport container.

Figures 11, 19, 20, 21, 22:
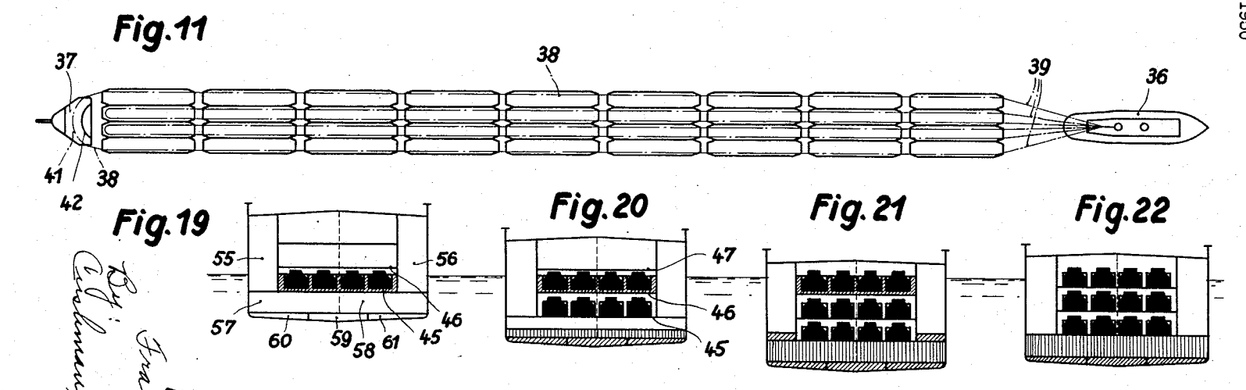
Figure 12:
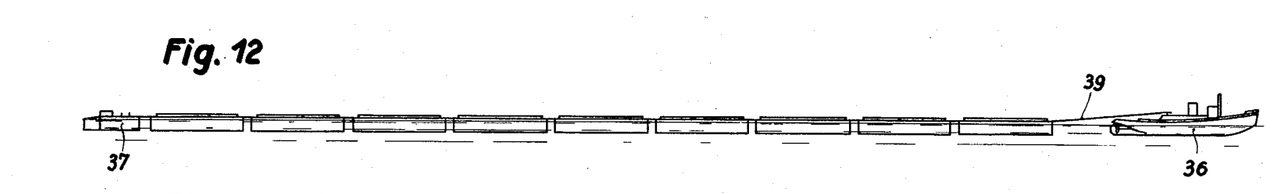

After the transfer of the floatable transport containers from rail or road to water has been finished the different containers having no individual driving and steering equipment are connected to a float of which a horizontal plan is shown in Fig. 11 and a longitudinal section in Fig. 12. The example in Fig. 11 shows a float of thirty-six floatable containers which will be able to transport a total load of about 3240 tons of coal in which the capacity of one individual container with optimum dimensions is about 90 tons of coal.

Figure 13:
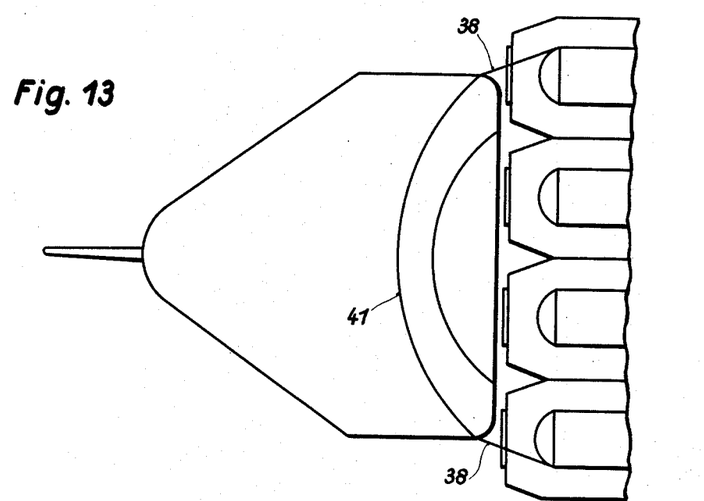
Figure 14:
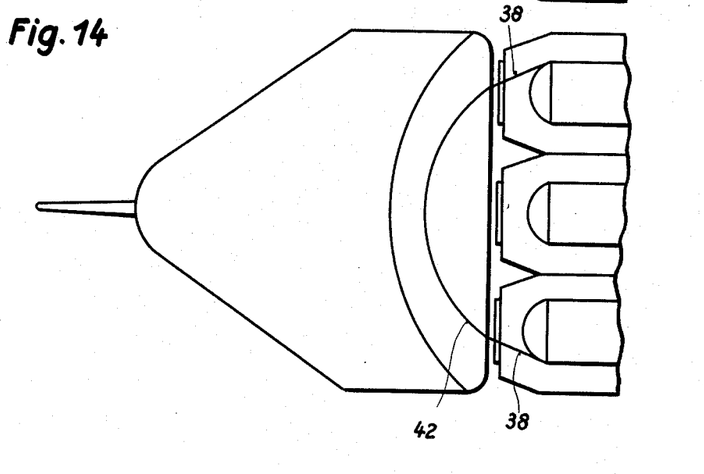
Figures 15, 16:
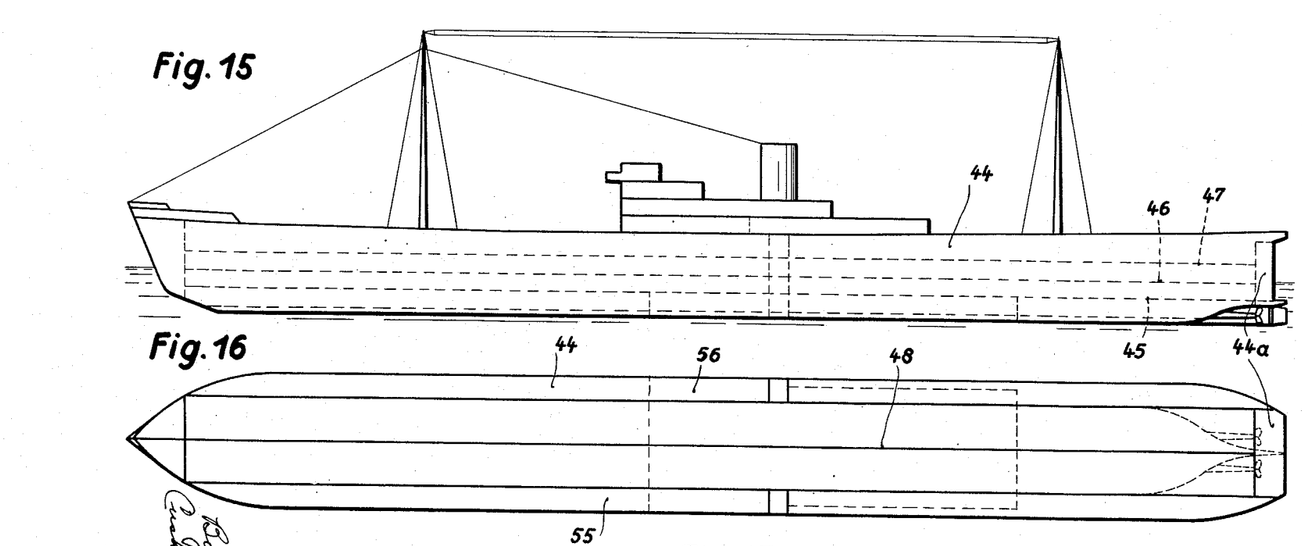
Figure 17:
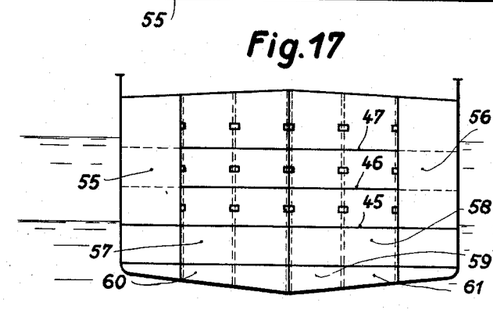
Figure 18:
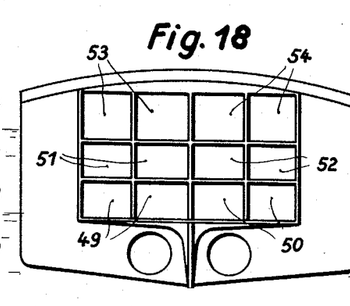
Figure 23:
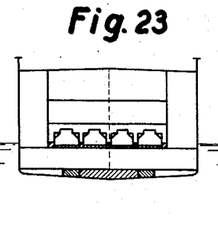
Figure 24:
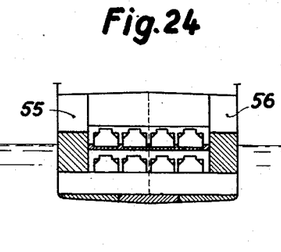
Figure 25:
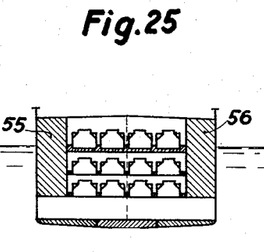
Figure 26:
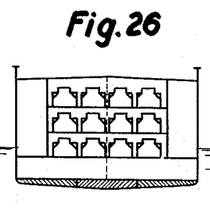

The float is towed by a tug-boat 36 and is steered by means of the attached wheel house 37. The pulling power of the tug-boat 36 is transmitted to the float by towing ropes 39 in such a way that each longitudinal row is kept together by only one rope which is fastened to each container by means of special clamps. The towing rope 38 running along the outer rows of the float is led to a return pulley on the wheel house 37 shown on Fig. 13 for a float of four rows and on Fig. 14 for a float of three rows. For a four-row float the towing rope 38 is led over the return pulley 41 and for the three-row float it is led over the smaller return pulley 42.

Up to date the transshipment of goods from a lighter to a seagoing vessel in a harbour has been performed in such a way that the goods were grabbed out by suitable equipments and then emptied into the ship's hold. This method of transshipment takes much time and the value of the goods is diminished by undesired grinding and crushing.

The present invention shows the structure of a new seagoing freighter which allows bulk goods to be more easily transferred from a lighter to a seagoing vessel. Moreover, the invention shows a method of performing the transshipment of bulk goods to a seagoing freighter built according to my invention. Using the freighter built and loaded according to my invention it is possible to perform the loading and discharge in a very short time without needing cranes, dredgers, etc. and without the goods being crushed.

The seagoing freighter 44 looks like a common freighter with the exception that the stern 44a is provided with a number of gates. In the ship's hold are three horizontal between decks 45, 46, 47 extending over practically the whole of the length and width of the ship and only supported by a partition wall 48 in the middle of the ship. The decks are water tight and can be closed at the stern with bulkhead-like gates 49—54. The freighter is equipped with special ballast tanks 55 and 56 regulating the draught of the ship. Furthermore, according to my invention, the freighter is equipped with tanks 57, 58 for liquids or ballast as well as with tanks for fuel oil 59 and drinking water 60 and 61 between the double bottom.

Loading of a seagoing freighter with floatable transport containers which have been transferred from rail to water, as described above, may be performed without using cranes etc. in the following way: The lowest deck of the empty ship, as shown in Fig. 19, is filled with so much water that the floatable transport container can float into this deck after the stern gates 49 and 50 have been opened. When the gates 49 and 50 have been closed the water in the lowest deck is pumped up to the next deck 46 and simultaneously the ballast tanks 57 and 61 are partially filled with water. By this procedure the transport containers come to stand on the bottom of the between deck 45 and moreover, the freighter gets more draught, consequently after having opened the stern gates 51 and 52, according to Fig. 20, the floating containers now can enter this deck. After the stern gates 51 and 52 have been closed the water on the between deck 46 is pumped up to deck 47 as described above, and the tanks 55—61 are filled up with freight or ballast. At last the between deck 47 is loaded, as may be seen at Fig. 21, after the stern gates 53 and 54 have been opened. The ship is ready to sail, according to Fig. 22, when the stern gates 53 and 54 have been closed and the water on the between deck 47 and eventually part of the dead freight from the ballast tanks 55 and 56 has been pumped out.

It is obvious that this method of loading is simple and takes little time and there is no injury to the goods.

Discharging the freighter is done the inverse way, i. e. the highest between deck 47 is discharged first.

Loading of the seagoing freighter with empty floatable transport containers, as seen in Figs. 23–26, takes place substantially the same manner as with filled containers. In order to have sufficient draught of the freighter it is, however, necessary to fill up the ballast tanks 55 and 56 with water. After the loading is finished the ballast may be pumped out as per Fig. 26.

If the bulk goods are transported to the harbour by rail it is necessary to transfer the floatable containers from rail to water and then the loading of the freighter can be performed in the above described manner.

Figure 27:
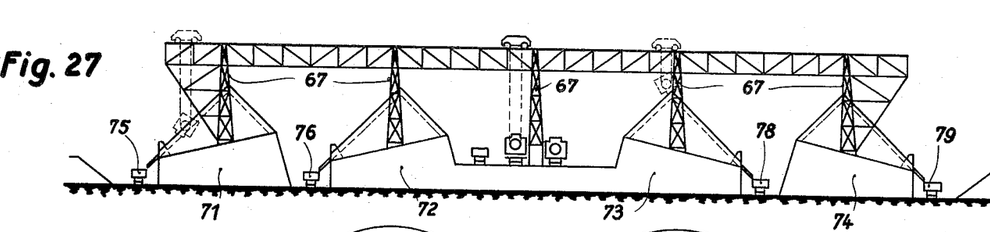
Figure 28:
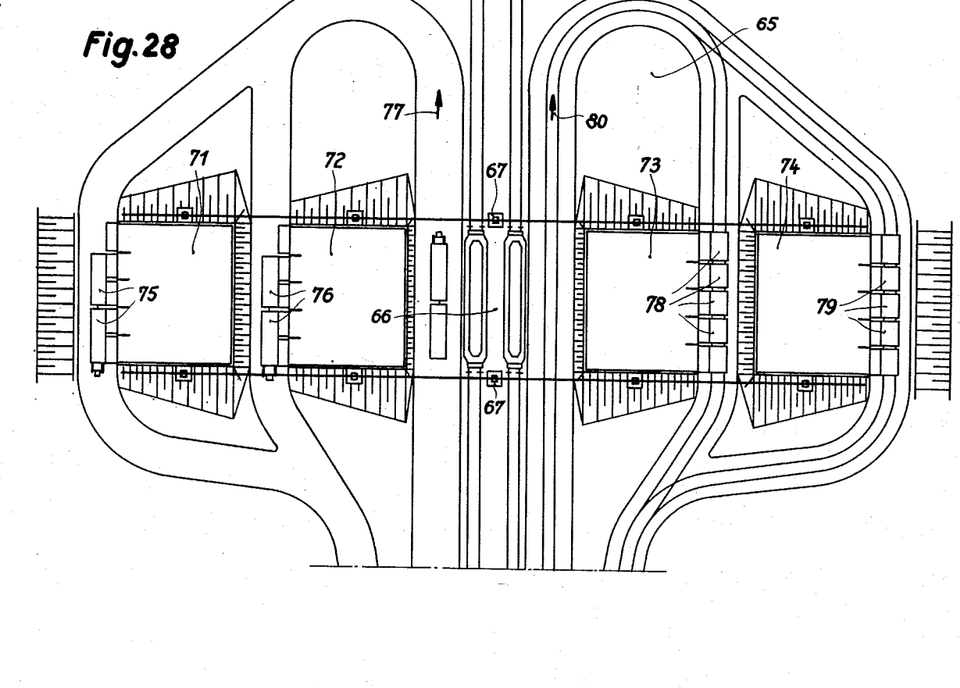
Figure 29:
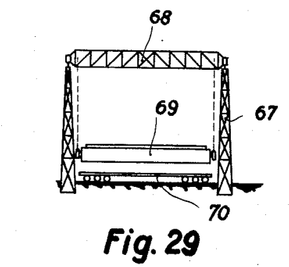

In order to take full advantage of the new transport methods and equipment, according to my invention, it is necessary to provide special discharge methods and plants at the final discharge yard and for the distribution to the consumers, as shown in Figs. 27–29. The floatable transport containers will be transferred on to railroad vehicles by means of a subwaterway and will then run to the discharge yard 65. At point 66 the vehicle loaded with the container is put under the trolley runway 67 of a crane 68. The crane 68 lifts the container 69 from the railway undercarriage 70 by means of the toothed wheels fixed to the outer faces of the container. The container is then moved sidewards and tilted on its longitudinal axis so that the goods, i. e. coal, glide down on to the oblique discharge ramps 71—74. The trucks 75 and 76 having entered the yard on street 77 in direction of the arrow, are placed by the lower side of the ramps 71 and 72 so that the goods may glide into the trucks. On the other side of the discharge yard vehicles on rails 78 and 79 having entered the yard on the track 80 may be driven along the ramps 73 and 74 to be loaded with goods gliding from the ramps to the vehicles. The entire discharging yard, according to my invention, needs only little expenses as the yard may be built with only few artificial structures. Discharging the floatable containers is performed very quickly and labour can be reduced considerably. Owing to the oblique ramps the loading of the distribution vehicles is automatical.

I have now above described my present invention on the lines of a preferred embodiment thereof but my invention is not limited in all its aspects to the mode of carrying it out as described and shown since the invention may be variously em-

I claim:

1. In an apparatus for loading and unloading a floatable container from a railway carriage, the combination of a track having an inclined portion submerged in the water, said floatable container arranged to be movably mounted on said carriage and automatically released therefrom when the carriage is submerged, said container having eye-shaped holders extending outwardly from opposite ends thereof, and said carriage having spaced upwardly projecting retaining members arranged to fit into said holders when the container is mounted on the carriage to prevent lateral displacement of the container but allow its upward removal therefrom, the parts being constructed and arranged so that when the floatable container is being transferred from the water to the carriage, the latter is first moved into the water to a depth to be positioned directly below the container and is then moved up the inclined track so that the retaining member on the raised end of the carriage engages the bottom of the container until it registers with the eye-shaped holder on the adjacent end of the carriage at which point the retaining member moves upwardly into the holder so as to insure the proper positioning of the container on the carriage, the retaining member on the opposite end of the carriage being movable into engagement with the adjacent holder as the carriage is moved further upward on the inclined track so as to insure the container being firmly seated on the carriage as the latter is moved out of the water.

2. In an apparatus for loading and unloading a boat as called for in claim 1 in which the container is of substantially rectangular shape and has inclined end portions.

References Cited in the file of this patent

UNITED STATES PATENTS

| Number | Name | Date |
|---|---|---|
| 210,051 | Post | Nov. 19, 1878 |
| 820,974 | Hilpert | May 22, 1906 |
| 895,278 | Lettinger | Aug. 4, 1908 |
| 933,331 | Niedringhaus | Sept. 7, 1909 |
| 986,153 | Falvey | Mar. 7, 1911 |
| 987,017 | Robinson | Mar. 14, 1911 |
| 1,026,444 | Hunt | May 14, 1912 |
| 1,032,271 | Bransfield | July 9, 1912 |
| 1,263,651 | D'Amico | Apr. 23, 1918 |
| 1,267,956 | Baeck | May 28, 1918 |
| 2,134,352 | Baer | Oct. 15, 1938 |
| 2,231,138 | Pugh | Feb. 11, 1941 |

FOREIGN PATENTS

| Number | Country | Date |
|---|---|---|
| 19,687 | Germany | Oct. 16, 1882 |